Aug. 9, 1927.  
W. O. KENNINGTON  
1,638,265

ENGINE STARTING APPARATUS

Filed Nov. 14, 1925

Inventor  
William O. Kennington  
By Spencer Sewall and Hardman  
his Attorneys Patented Aug. 9, 1927.

1,638,265

UNITED STATES PATENT OFFICE.

WILLIAM O. KENNINGTON, OF LONDON, ENGLAND, ASSIGNOR, BY MESNE ASSIGN-
MENTS, TO DELCO-REMY CORPORATION, OF DAYTON, OHIO, A CORPORATION OF
DELAWARE.

ENGINE-STARTING APPARATUS.

Application filed November 14, 1925. Serial No. 69,032.

This invention relates to engine starting apparatus, and particularly the type of apparatus comprising a threaded shaft driven by an electric motor and carrying a nut which is endwise movable along the shaft and carries a gear into and out of engagement with the gear connected with an engine to be started.

One of the objects of the invention is to minimize the breakage of gear teeth, due particularly to the engagement of the gear on the motor-driven shaft with the engine gear.

One manner of carrying out the present invention is to mount upon the nut, which travels endwise along the threaded shaft, a plurality of aligned gear elements, each of relatively small mass,—each gear being formed preferably out of thin sheet metal. Each gear element is connected with the nut by a lost-motion, splined connection permitting a limited amount of motion of the gear relative to the nut. The end faces of the engine gear teeth, adjacent the motor gear, are beveled or chamfered; and the end faces of the gear teeth of each motor gear element are likewise chamfered, to facilitate meshing of the gears. The rotation of the motor-driven screw shaft will cause each of the motor gear elements to be brought successively into engagement with the engine gear. Since each motor gear element has a relatively small mass, the force of the impact delivered by each motor gear element against the engine gear will be relatively small, as compared with the conventional type of screw-and-nut gear shift employing a solid motor-driven gear having a relatively wide gear face.

Further objects and advantages of the present invention will be apparent from the following description, reference being had to the accompanying drawings, wherein a preferred form of the present invention is clearly shown.

Figure 1:
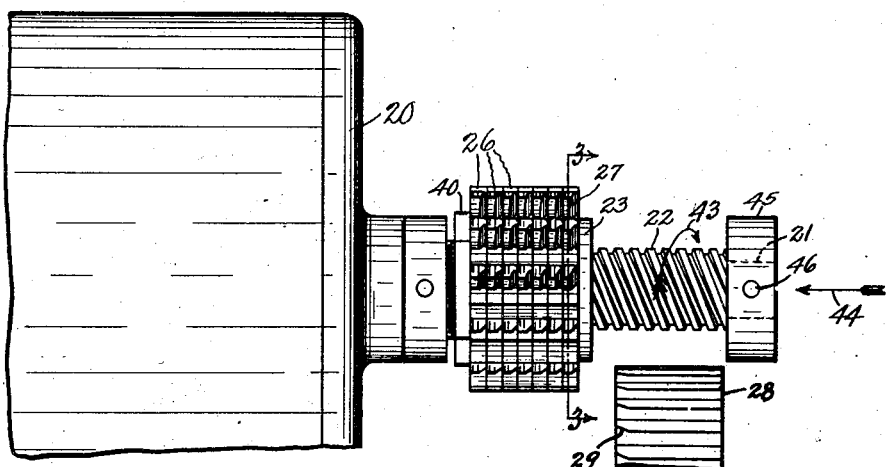
Fig. 1 is a fragmentary side view of starting apparatus embodying the present invention.

Referring to the drawings, 20 designates an electric motor which operates a shaft 21 having a screw-threaded portion 22 for engaging an internally-threaded nut 23. The nut 23 is provided with a plurality of longitudinally-extending splines 24 which are received by notches 25 provided internally of a plurality of aligned motor gear elements 26, each having the end faces of their gears chamfered, as designated by numeral 27, for facilitating the engagement of the gear elements 26 with a gear 28, which is connected with the engine to be started. The end faces of the gear 28 are beveled at 29 to facilitate the engagement of the gear elements 26 with the gear 28. The notches formed internally of the gear elements 26 define internal splines 31 which receive the splines 24 of the nut 23, so that the nut will drive the gear elements 26. The splines 24 are less in width than the notches 25, so that a lost-motion, splined connection is provided by the nut 23 and the gear elements 26.

Figure 3:
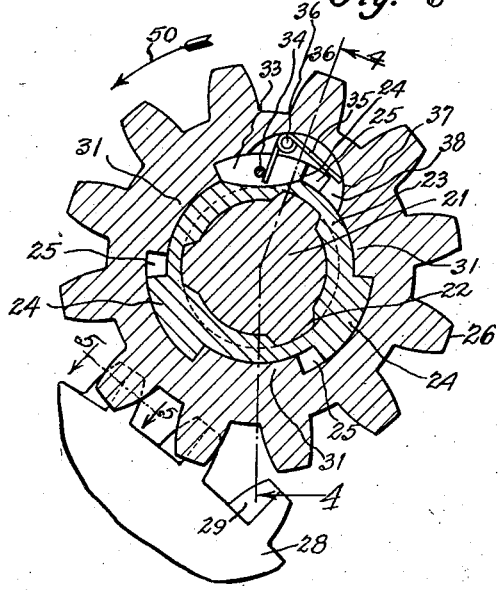
Fig. 3 is a sectional view on an enlarged scale, taken on the line 3—3 of Fig. 1.
Figure 4:
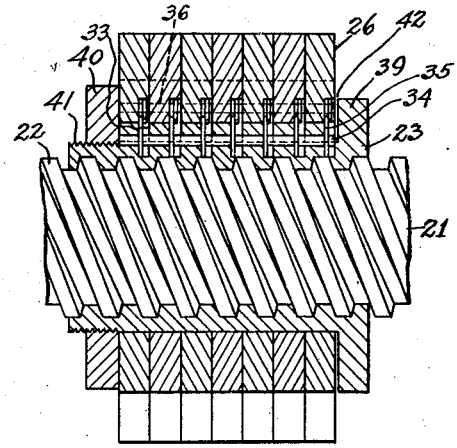
Fig. 4 is a sectional view taken on the line 4—4 of Fig. 3.

One of the splines 24 of the nut 23 is provided with a number of slots 33, one for each gear element 26. A rod 34 extends across the slots 33. In order that each gear element will be normally located relative to the nut, so that the lost-motion, splined connection will be taken up in a certain direction, (depending on the direction of rotation of the shaft 21), each gear element 26 carries a spring 35 having an intermediate portion coiled about a pin 36 carried by the gear element 26, having one end portion bearing against the rod 34, and the other end portion bearing against a wall 37, which defines a recess 38 with which each gear element 26 is provided. Each recess 38 will be located in the plane of one of the notches 33. Therefore, in Fig. 3 for example, each spring 35 tends to produce clockwise rotation of the gear element 26 relative to the splines 33, and consequently counterclockwise rotation of the nut 23 relative to the gear element 26. Therefore, the spring 35 tends normally to produce relative movement between each gear element and the nut, so that the lost-motion, driving connection between these parts is taken up in one direction.

Endwise movement of the gear elements 26 is limited by placing them between a shoulder 39 provided by the nut 23, and a nut 40, which engages the screw-threaded portion 41 of the nut 23. A space indicated by the numeral 42, designates clearance sufficient to permit each gear element 26 to rotate without dragging an adjacent gear with it, due to friction between the adjacent surfaces of the gear elements.

The motor 20 is connected with a current source by a suitable switch, causing the motor shaft 21 to revolve, for example, in the direction of the arrow 43 in Fig. 1, or clockwise as viewed in the direction of arrow 44. Due to the inertia of the nut 23 and the gear elements 26, the nut will not immediately rotate as fast as the shaft 21. Therefore, the nut 23 will move endwise to the right, as viewed in Fig. 1, to bring the gear elements 26 successively into mesh with the gear 28. This endwise movement of the nut 23 is arrested by a stop 45 which is attached by a pin 46, or the like, to the shaft 21. When the nut 23 strikes the stop 45, the nut 23 will be positively connected for rotation by the shaft 21, so that the motor will rotate the engine gear 28 to crank the engine. When the engine becomes self-operative, nut 23 will be threaded to the left in Fig. 1, due to the fact that the engine tends to drive the gear elements 26 at a greater speed than said elements are driven by the motor 20.

Figures 5, 6:
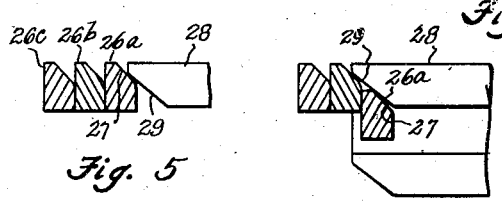
Fig. 5 is a sectional view on the line 5—5 of Fig. 3.
Fig. 6 is a view similar to Fig. 5, showing one of the motor gear elements going into mesh with the engine gear.
Figure 2:
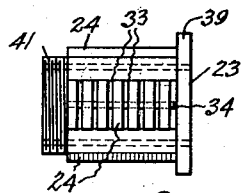
Fig. 2 is a side view of the nut element included in the apparatus shown in Fig. 1.

Especially where a series-wound motor is used for starting an engine, the motor speed increases very rapidly after the switch is closed. Therefore, the gear elements 26 will be moving with considerable velocity toward the right when they strike the end faces of the teeth of gear 28. The gear element 26 which is nearest the engine gear 28, (this gear being designated by numeral 26ª) will be the first to strike the engine gear 28. As the nut 23 moves endwise, the gear element 26ª will be cammed from the position shown in Fig. 5 to the position shown in Fig. 6, thereby causing this gear element to be rotated counterclockwise, or in the direction of arrow 50 in Fig. 3. The gear element is moved in opposition to the turning effect of the spring 35, so as to take up the lost motion between the splines 31 and 24. Therefore, it is apparent that each separate gear element 26 will yield independently of the others, as soon as it strikes the end face of one of the teeth of gear 28. It is apparent that by making each gear element of relatively small mass, the end faces of the gear teeth 28 will receive a succession of relatively slight blows as the gear elements are moved into mesh with gears 28. The liability of breakage of the gear teeth is much less than when using the conventional type screw shift having a solid motor-driven gear.

While the form of embodiment of the present invention as herein disclosed, constitutes a preferred form, it is to be understood that other forms might be adopted, all coming within the scope of the claims which follow.

What is claimed is as follows:

1. Engine starting apparatus comprising, in combination, an electric motor, a screw-threaded shaft driven by the motor, a nut movable endwise along the shaft and rotated by the shaft, a motor driven gear comprising a plurality of gear elements of relatively small mass movable into mesh with the gear of an engine to be started, means connecting the gear elements with the nut to cause the gear elements to move endwise by endwise motion of the nut, and means connecting the gear elements with the nut for rotation of the gear elements by rotation of the nut, the last-mentioned connections providing for limited rotation of each gear element with respect to the other.

2. Engine starting apparatus comprising, in combination, an electric motor, a screw-threaded shaft driven by the motor, a nut movable endwise along the shaft and rotated by the shaft, a motor driven gear comprising a plurality of gear elements of relatively small mass mounted on the nut, driving connections between the nut and each gear element providing for limited rotary movement of each gear element relative to the nut, and spaced stops provided by the nut between which stops the gear elements are located loosely so that each gear element may rotate relative to the nut independently of the other gear elements.

3. Engine starting apparatus comprising, in combination, an electric motor, a screw-threaded shaft driven by the motor, a nut movable endwise along the shaft and rotated by the shaft, and having external longitudinally extending splines, a plurality of similar gear elements of relatively small mass mounted on the nut and each having notches of greater width than the splines for receiving the splines whereby each gear element has a lost-motion connection with the nut, spring devices for normally locating each gear element relative to the nut so that normally the teeth of the gear elements will be in alignment, and means carried by the nut for imparting endwise motion to the gear elements.

4. Engine starting apparatus comprising, in combination, a motor, a motor driven gear comprising a plurality of gear elements each of relatively small mass movable into mesh with the gear of an engine to be started, means for axially moving the gear elements successively into engagement with the engine gear, and driving connections between the motor and motor gear providing for limited rotation of each gear element with respect to the other.

5. Engine starting apparatus comprising, in combination, a motor, a motor driven gear comprising a plurality of gear elements each of relatively small mass movable into mesh with the gear of an engine to be started, a member drivingly connected with the gear elements by means providing for limited rotation of each gear element with respect to the other, and means so connecting the member with the motor that said member will be moved bodily by the motor in a direction to mesh the gear elements axially with the engine gear, and then will be rotated by the motor.

6. Engine starting apparatus comprising, in combination, a motor, two screw-threadedly connected members one of which is rotatably connected with the motor and causes by its rotation the endwise bodily movement of the other member and the driving of said other member, a motor driven gear comprising a plurality of gear elements each of relatively small mass movable into mesh with the gear of an engine to be started, and means for connecting the motor gear with the bodily movable threaded member, said means providing for limited rotation of each gear element with respect to the other.

In testimony whereof I hereto affix my signature.

WILLIAM O. KENNINGTON.